United States Patent
Suzuki et al.

(10) Patent No.: US 8,499,574 B2
(45) Date of Patent: Aug. 6, 2013

(54) INSIDE TEMPERATURE CONTROL DEVICE FOR COLD STORAGE

(75) Inventors: Yoshiyasu Suzuki, Toyoake (JP); Hiroshi Yano, Toyoake (JP)

(73) Assignee: Hoshizaki Denki Kabushiki Kaisha, Aichi (JP)

( * ) Notice: Subject to any disclaimer, the term of this patent is extended or adjusted under 35 U.S.C. 154(b) by 752 days.

(21) Appl. No.: 12/675,213

(22) PCT Filed: Aug. 21, 2008

(86) PCT No.: PCT/JP2008/064882
§ 371 (c)(1),
(2), (4) Date: Feb. 25, 2010

(87) PCT Pub. No.: WO2009/031410
PCT Pub. Date: Mar. 12, 2009

(65) Prior Publication Data
US 2010/0235013 A1    Sep. 16, 2010

(30) Foreign Application Priority Data
Sep. 6, 2007 (JP) .................. 2007-231697

(51) Int. Cl.
*F25B 49/02* (2006.01)
(52) U.S. Cl.
USPC ............ 62/228.1; 62/228.4; 62/229; 700/300
(58) Field of Classification Search
USPC .................. 700/300; 62/228.1, 228.4, 229
See application file for complete search history.

(56) References Cited

U.S. PATENT DOCUMENTS

| 4,662,185 A | 5/1987 | Kobayashi et al. |
| 2007/0144188 A1 | 6/2007 | Kaga et al. |

FOREIGN PATENT DOCUMENTS

| CN | 1287256 | 3/2001 |
| CN | 1871482 | 11/2006 |
| JP | 61-203891 | 9/1986 |
| JP | 4-187970 | 7/1992 |
| JP | 2001-82850 | 3/2001 |
| JP | 2005-121341 | 5/2005 |
| WO | 2005/038365 | 4/2005 |

OTHER PUBLICATIONS

International Search Report issued Nov. 18, 2008 in International (PCT) Application No. PCT/JP2008/064882.

*Primary Examiner* — Marc Norman
*Assistant Examiner* — Jonathan Bradford
(74) *Attorney, Agent, or Firm* — Wenderoth, Lind & Ponack, L.L.P.

(57) ABSTRACT

While an inverter compressor 32 is driven in a control range, an actual temperature drop S is calculated based on a detected inside temperature TR at every predetermined sampling time. Further, a target temperature drop Ac for the inside temperature TR is taken out of data on a cooling characteristic Xc. If the actual temperature drop S is smaller than the target temperature drop Ac, the inverter compressor 32 is controlled to increase a speed thereof. If it is larger, the inverter compressor 32 is controlled to decrease the speed. Inside of a cold storage is cooled down along the cooling characteristic Xc through those controls. Especially after the inside temperature TR has decreased from an upper limit temperature TH and reached the target temperature To, the speed of the inverter compressor 32 is controlled such that the target temperature drop remains at substantially zero (cooling characteristic $Xc_2$).

5 Claims, 9 Drawing Sheets

INSIDE TEMPERATURE CONTROL DEVICE FOR COLD STORAGE

TECHNICAL FIELD

The present invention relates to an inside temperature control device for a cold storage.

BACKGROUND ART

The inventor of the present invention has proposed high efficiency controlled cooling for maintaining an inside of a storage at around a predetermined temperature by using an inverter compressor (see Patent Document 1). The controlled cooling will be explained specifically with reference to FIG. 8. A control range is defined by an upper limit temperature TH that is a predetermined temperature higher than a target inside temperature To and a lower limit temperature TL that is a predetermined temperature lower than the target inside temperature To. A cooling characteristic (or a target temperature curve) that show variations in target temperature drop over time are predetermined for the control range. While the inverter compressor is driven in the control range, an actual temperature drop is calculated based on a detected inside temperature at every determined sampling time. The actual temperature drop is then compared with the target temperature drop contained in data on the above temperature curve at the inside temperature. If the actual temperature drop is smaller than the target temperature drop, the inverter compressor is controlled to increase the speed. If it is larger, the inverter compressor is controlled to decrease the speed. The inside temperature is controlled along the target temperature curve through the compressor speed control. Namely, the inside temperature is gradually decreased over a prolonged period of time in comparison to that in a pull-down range.

With this control, continuous turn-on time of the compressor greatly extends. Namely, switching between on and off is greatly reduced and the compressor is driven at a low rotation speed. Therefore, high efficiency and energy saving can be achieved. [Patent Document 1] Japanese Unexamined Patent Application Publication No. 2005-121341

DISCLOSURE OF THE INVENTION

Problem to be Solved by the Invention

During the above temperature control, a required cooling capacity increases as the inside temperature decreases. As illustrated in FIG. 8, the rotation speed of the inverter compressor tends to increase around the lower limit temperature TL and thus power consumption increases.

The present invention was made in view of the foregoing circumstances, and an object thereof is to provide an inside temperature control device for a cold storage that consumes far less energy.

Means for Solving the Problem

An inside temperature control device for a cold storage of the present invention includes a cooling device, a memory device, a temperature sensor and a drive control device. The cooling device has a capacity variable type compressor. The memory device stores data on cooling characteristic that shows how a target temperature drop varies over time in a cooling range between an upper limit temperature that is a predetermined temperature higher than a predetermined target temperature and a lower limit temperature that is a predetermined temperature lower than the target temperature. The temperature sensor detects an inside temperature. The drive control device adjusts a capacity of the compressor such that the inside temperature decreases along the cooling characteristic read from the memory device based on an output of the temperature sensor. The cooling characteristic stored in the memory device is defined such that a temperature drop remains at substantially zero after a temperature has decreased from the upper limit temperature and reached the target temperature.

The temperature drop is defined by how much the temperature has dropped per unit time.

With this configuration, the capacity of the compressor is controlled while the compressor is driven in a control range such that the temperature decreases along the cooling characteristic that contains inside temperature data stored in advance. Especially after the inside temperature has decreased from the upper limit temperature to the target temperature, the capacity of the compressor is controlled such that the temperature drop remains at substantially zero. By defining the cooling characteristic to have a gentle slope, the compressor can be driven continuously with a low capacity. Therefore, the inside of the cold storage can be cooled down with low energy consumption. Further, the temperature drop is maintained at substantially zero after the temperature has reached the target temperature, that is, the compressor can be driven with a low capacity in comparison to a case that the temperature is decreased to the lower limit temperature. Therefore, further energy saving can be achieved.

Furthermore, the inside temperature control device can have the following configurations.

(1) The compressor is a speed controllable inverter compressor. The drive control device includes a temperature variation calculation section, a target temperature drop output section, a comparison section and a speed control section. The temperature variation calculation section calculates an inside temperature drop at every predetermined sampling time based on a signal from the temperature sensor. The target temperature drop output section outputs a target temperature drop for an inside temperature at the sampling time based on the cooling characteristic data stored in the memory device at every sampling time. The comparison section compares an actual temperature drop calculated by the temperature variation calculation section with the target temperature drop output from the target temperature drop output section. The speed control section controls a speed of the inverter compressor based on a comparison result from the comparison section so as to increase the speed of the inverter compressor when said actual temperature drop is smaller than the target temperature drop and to decrease the speed of said inverter compressor when the actual temperature drop is larger than the target temperature drop.

In this configuration, the actual temperature drop is calculated based on a detected inside temperature at every predetermined sampling time while the inverter compressor is driven in the control range. Moreover, the target temperature drop for the inside temperature is taken out of the data on the cooling characteristic. If the actual temperature drop is smaller than the target temperature drop, the speed of the inverter compressor is increased. If it is larger, the speed of said inverter compressor is decreased. The inside of the cold storage is cooled down along the cooling characteristic through those controls. Especially after the inside temperature is decreased from the upper limit temperature to the target temperature, the speed of the inverter compressor is controlled such that the temperature drop is maintained at substantially zero. The inverter compressor can be driven with a low capacity in comparison to a case that the temperature is decreased to the lower limit temperature after it has reached the target temperature. Therefore, further energy saving can be achieved.

(2) The drive control device further includes a correction device. It corrects the cooling characteristic such that the target temperature drop takes a negative value in a range equal to or under a sub-target temperature that is higher than the lower limit temperature but a predetermined temperature lower than the target temperature when the inside temperature is determined as equal to or lower than the sub-target temperature.

In this configuration, when the inside temperature has become equal to or lower than the sub-target temperature that is the predetermined temperature lower than the target temperature while the inverter compressor is driven in the control range, the speed of the inverter compressor is controlled such that the temperature drop takes a negative value. As a result, the inside temperature is maintained at around the target temperature with high accuracy.

(3) The drive control device further includes an inverter compressor stop function. It stops the inverter compressor when the inside temperature is detected as reaching the lower limit temperature.

If an outside temperature is low or the target temperature is high, the inside of the cold storage may be cooled down equal to or below the target temperature (the lower limit temperature) even when the rotation speed of the inverter compressor is decreased to the lowest rotation speed. In the above configuration, the inverter compressor is stopped when the inside temperature has reached the lower limit temperature. Therefore, the inside of the cold storage is less likely to be cooled down more than necessary.

Effect of the Invention

According to the present invention, the inside temperature can be controlled while further energy saving is achieved.

EXPLANATION OF REFERENCE SYMBOLS

30: Cooling device, 32: Inverter compressor, 39: Inside temperature sensor, 40: Control section, 42: Data storage section, 44: Inverter circuit, TR: Inside temperature, To: Target temperature, TH: Upper limit temperature, TL: Lower limit temperature, Xc, Xc1, Xc2: Target temperature curve (Cooling characteristics) (in a control range), S: Actual temperature drop, Ac: Target temperature drop.

BEST MODE FOR CARRYING OUT THE INVENTION

Embodiment

An embodiment of the present invention will be explained with reference to FIGS. 1 through 7. In this embodiment, a commercial-use upright freezer is used as an example.

Figure 1:
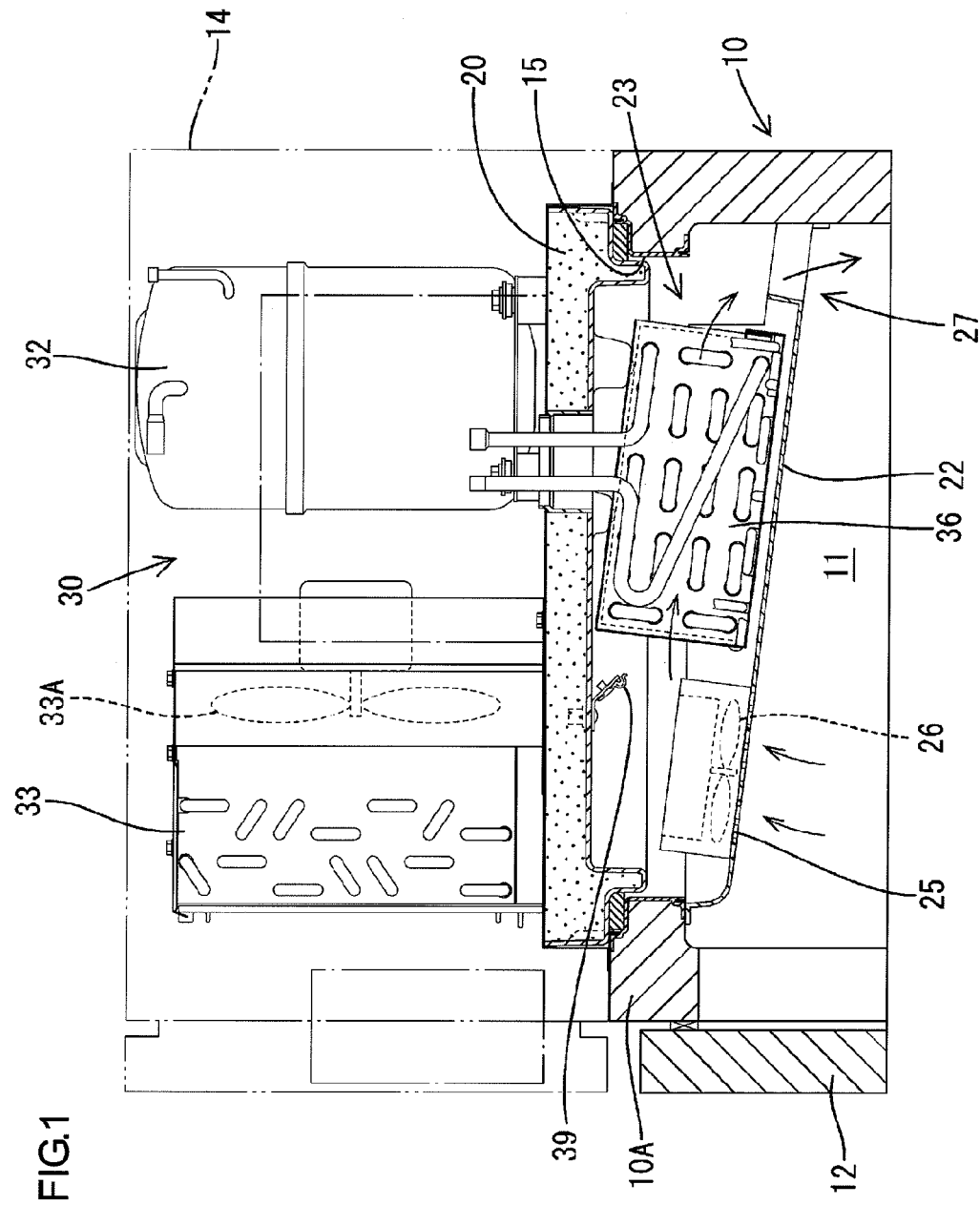
FIG. 1 is a cross-sectional view illustrating a part of a cooling device near the footprint area according to an embodiment of the present invention.

In FIG. 1, the number 10 indicates a freezer body that is an insulated casing having an opening on the front. The inside of the body is a freezer compartment 11, and an insulating door 12 is assembled covering the opening of the freezer compartment 11 so as to be swingably openable and closable. Panels are installed on the top surface of the freezer body 10 so as to form a mechanical chamber 14.

At substantially the center of a ceiling 10A of the freezer body 10, which is also a bottom of the mechanical chamber 14, a rectangular opening 15 is provided. A unit base 20 on which a unitized cooling device 30, which will be explained later, is mounted so as to cover the opening 15 from the top. A cooling duct 22 that also functions as a drain pan is installed at a downslope angle extending from an edge of the lower surface of the ceiling 10A located on the front side of the opening 15 (on the left side in FIG. 1) toward a back wall. An evaporator chamber 23 is provided between the unit base 20 and the cooling duct 22. An air suction port 25 is provided in a front end area of the cooling duct 22, an internal fan 26 is attached to an inner surface of the cooling duct 22 in the area, and an air outlet 27 is provided in a rear end area of the cooling duct 22.

Figure 2:
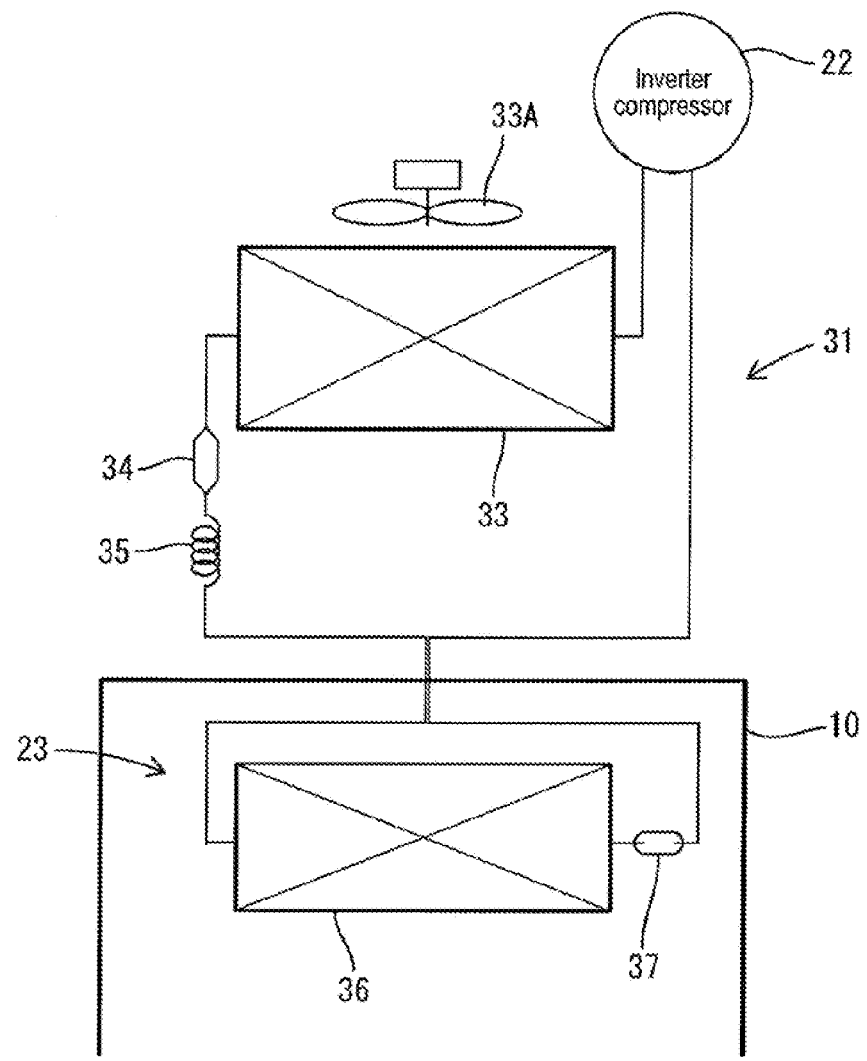
FIG. 2 is a circuit diagram of the cooling device.

The cooling device 30 has a freezer circuit 31. As illustrated in FIG. 2, the freezer circuit 31 includes an inverter compressor 32, a condenser 33, a dryer 34, a capillary tube 35, the evaporator 36 and an accumulator 37. They are cyclically connected via refrigerant piping. The inverter compressor 32 is configured such that the rotation speed is variable and the capillary tube 35 is decompression means.

Among these components of the freezer circuit 31, the inverter compressor 32, the condenser 33, the dryer 34, the capillary tube 35 are arranged on the upper surface of the unit base 20 while the evaporator 36 and the accumulator 37 are hung from the lower surface of the unit base 20. They are unitized. A condenser fan 33A is installed behind the condenser 33. When the unit base 20 is placed over the opening 15 of the ceiling 10A of the freezer body 10, the evaporator 36 is housed in the evaporator chamber 23 behind the internal fan 26.

When the cooling device 30 and the internal fan 26 are driven, air basically flows as indicated by arrows in FIG. 1. The air in the freezer compartment 11 is sucked into the evaporator chamber 23 through the suction port 25. While passing through the evaporator 36, the air is cooled down by heat exchange. The cold air is then blown out from the air outlet 27 to the freezer compartment 11. As the air is circulated in the above manner, the inside of the freezer compartment 11 is cooled down.

In this embodiment, means of controlling a temperature inside the freezer compartment 11 (inside temperature) along a predetermined temperature curve is used. The means will be explained next.

Controlled cooling and pull-down cooling are available for cooling down the inside of the freezer compartment 11. In the controlled cooling, the inside of the freezer compartment 11 is maintained at around a target temperature. In the pull-down cooling, the inside of the freezer compartment 11 is forcedly cooled down to around the target temperature when the inside temperature has increased due to an increase in load or ambient temperature.

Figure 3:
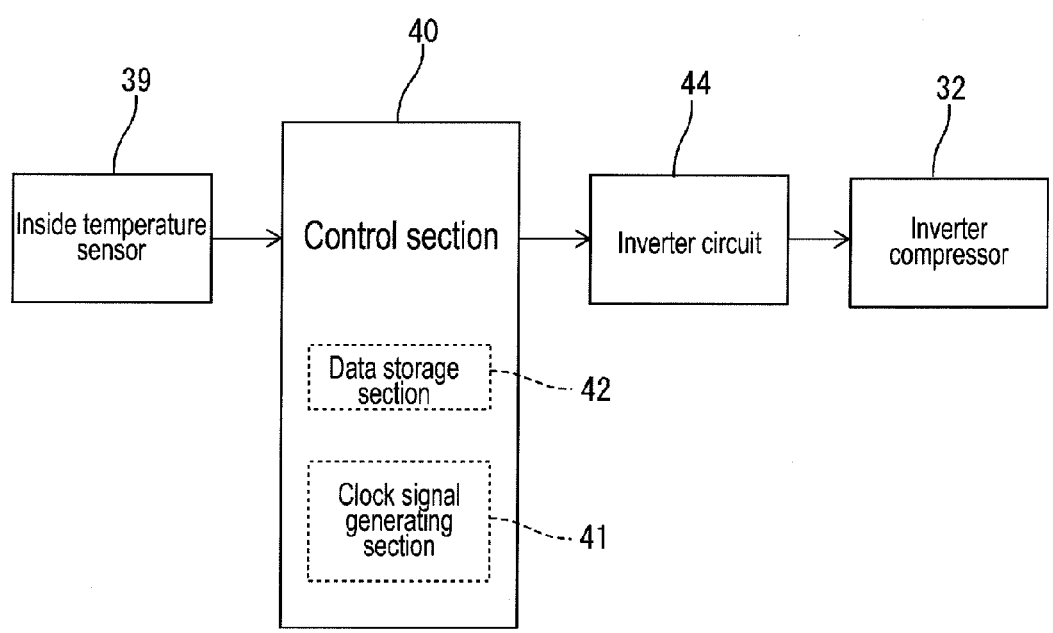
FIG. 3 is a block diagram of a control system of an inverter compressor.

As illustrated in FIG. 3, a control section 40 including a microcomputer and the like and executes predetermined programs is provided. It is housed in an electrical component box (not shown) disposed on the upper surface of the unit base 20. The control section 40 corresponds to a drive control device of the present invention and includes the temperature variation calculation section, the target temperature the drop output section, the comparison section, and the speed control section of the present invention. An inside temperature sensor 39 for detecting the inside temperature is connected to the control section 40 on its input side. As illustrated in FIG. 1, the inside temperature sensor 39 is disposed on a downstream side with respect to the internal fan 26 in the evaporator chamber 23.

The control section 40 includes a clock signal generating section 41 and a data storage section 42 (corresponding to the memory device of the present invention). The data storage section 42 stores target temperature curve data Xc, Xp illustrated in FIG. 4 for the controlled cooling and the pull-down cooling.

The control range is a temperature range between the upper limit temperature TH that is a predetermined temperature (e.g., 2 K) higher than the predetermined target temperature To and the lower limit temperature TL that is a predetermined temperature (e.g., 2 K) lower than the target temperature To. The pull-down range is a temperature range over the upper limit temperature TH.

The target temperature curve Xp in the pull-down range is a linear function line with a relatively steep slope. The target inside temperature drop in the temperature curve Xp (temperature drop per unit time: $\Delta T/\Delta t$) is a constant value Ap (K/min) regardless of the inside temperature. The inside target temperature drop Ap may be referred to simply as a target value Ap hereinafter.

The target temperature curve Xc in the control range includes a temperature curve $Xc_1$ between the upper limit temperature TH and the target temperature To and a temperature curve $Xc_2$ equal to or under the target temperature To.

The temperature curve $Xc_1$ between the upper limit temperature TH and the target temperature To is defined as a line with a gentle slope in comparison with that of the target temperature curve Xp in the pull-down cooling. The target inside temperature drop Ac (K/min), which may be referred to simply as a target value Ac, is constant but smaller than the target temperature drop (target value) Ap in the pull-down cooling.

On the other hand, the temperature curve $Xc_2$ equal to or under the target temperature To is a line with the target inside temperature drop is 0 (zero) (K/min), that is, a flat line.

The target temperature curves Xp, Xc in those ranges are stored in the data storage section 42 of the control section 40 and used during execution of the programs related to cooling operation.

The inverter compressor 32 explained earlier is connected to the control section 40 on its output side via the inverter circuit 44. Five rotation speeds are available in the inverter compressor 32 of the present embodiment.

The control section 40 has the following functions.

During drive control of the inverter compressor 32 in the control range, the inside temperature TR detected by the inside temperature sensor 39 may become equal to or lower than a sub-target temperature Toa (see FIG. 4) that is a predetermined temperature (e.g., 0.5 K) lower than the target temperature To but higher than the lower limit temperature TL. For such a case, a correction device is provided. The correction device corrects the target temperature curve Xc in the control range to a temperature curve such that the target inside temperature drop (or target value) is −Ac (K/min) in the range equal to or under the sub-target temperature Toa.

A stop control function is also provided to stop the inverter compressor 32 when the inside temperature TR is detected as reaching the lower limit temperature TL during the drive control of the inverter compressor 32 in the control range.

Next, operational flows of the present embodiment will be explained with reference to FIG. 4 and a flowchart illustrated in FIG. 5.

First, a control flow during the pull-down cooling will be explained. Referring to the flowchart illustrated in FIG. 5, the inside temperature TR is detected at every predetermined sampling time (step S1) and an actual inside temperature drop S is calculated based on the detected inside temperature TR at the every sampling time (step S2). Then, the inside temperature TR is determined in step S3. Because the pull-down range is a temperature range above the upper limit temperature TH of the target temperature To, a comparison TR>TH is performed. In step S4, the calculated inside temperature drop S is compared with the target inside temperature drop Ap of the temperature curve Xp read from the data storage section 42.

If the calculated value S is larger than the target value Ap and the current rotation speed is not the lowest speed (No in step S8), the inverter compressor 32 reduces the rotation speed by one step (step S10). If it is the lowest speed (Yes in step S8), the inverter compressor 32 maintains the current speed (step S11).

If the calculated value S is equal to the target value Ap, the inverter compressor 32 maintains the current rotation speed (step S11).

If the calculated value S is smaller than the target value Ap and the current rotation speed is not the highest speed (No in step S9), the inverter compressor 32 increases the rotation speed by one step (step S12). If it is the highest speed (Yes in step S9), the inverter compressor 32 maintains the current rotation speed (step S11).

Figure 4:
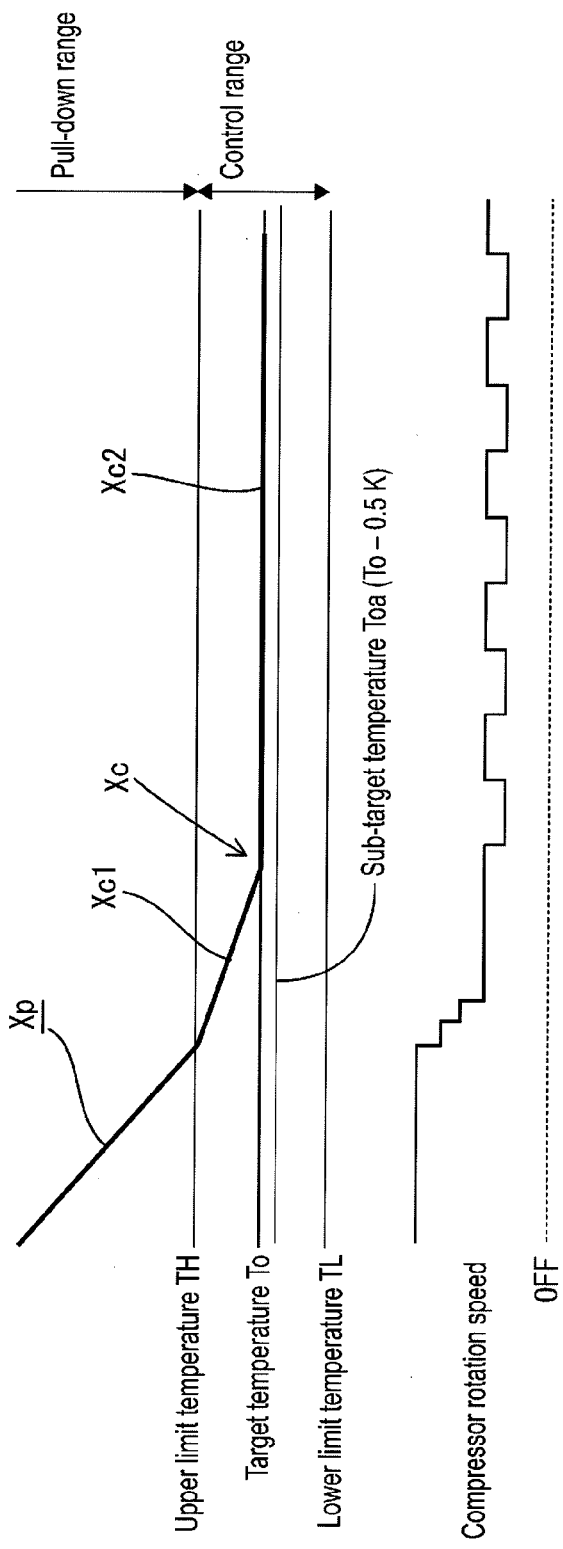
FIG. 4 is a chart illustrating a relationship between cooling characteristics and drive control of the inverter compressor.

The above control is repeatedly performed at every predetermined sampling time, and the inside of the freezer compartment 11 is cooled down by pull-down cooling along the target temperature curve Xp in the pull-down range illustrated in FIG. 4.

When the pull-down cooling has progressed and the inside temperature TR has become equal to or under the upper limit temperature TH (but higher than the target temperature To), that is, it has entered the control range, a comparison THTR>To is performed in step S3. In step S5, the calculated inside temperature drop S is compared with the target inside temperature drop Ac of the controlled cooling temperature curve $Xc_1$ read from the data storage section 42.

If the calculated value S is larger than the target value Ac and the current rotation speed is not the lowest speed (No in step S8), the inverter compressor 32 reduces the rotation speed by one step (step S10). If it is the lowest speed (Yes in step S8), the inverter compressor 32 maintains the current speed (step S11).

If the calculated value S is equal to the target value Ac, the inverter compressor 32 maintains the current rotation speed (step S11).

If the calculated value S is smaller than the target value Ac and the current rotation speed is not the highest speed (No in step S9), the inverter compressor 32 increases the rotation speed by one step (step S12). If it is the highest speed (Yes in step S9), the inverter compressor 32 maintains the current rotation speed (step S11).

The above control is repeatedly performed at every predetermined sampling time, and the inside of the freezer compartment 11 is cooled down along the target temperature curve $Xc_1$ in the range between the upper limit temperature TH and the target temperature To of the control range.

When the inside temperature TR decreases and enters the range between the target temperature To and the sub-target temperature Toa, a comparison To≧TR>(To−0.5 K) is performed in step S3. In step S6, the calculated inside temperature drop S is compared with the target inside temperature drop, which is 0 (zero), of the controlled cooling temperature curve $Xc_2$ read from the data storage section 42.

If the calculated value S is larger than the target value 0 and the current rotation speed is not the lowest speed (No in step S8), the inverter compressor 32 reduces the rotation speed by one step (step S10). If it is the lowest speed (Yes in step S8), the inverter compressor 32 maintains the current speed (step S11).

If the calculated value S is equal to the target value 0, the inverter compressor 32 maintains the current rotation speed (step S11).

If the calculated value S is smaller than the target value 0 and the current rotation speed is not the highest speed (No in step S9), the inverter compressor 32 increases the rotation speed by one step (step S12). If it is the highest speed (Yes in step S9), the inverter compressor 32 maintains the current rotation speed (step S11). The above control is repeatedly performed at every predetermined sampling time, and the inside of the freezer compartment 11 is cooled down along the target temperature curve $Xc_2$ (flat line) in the range between the target temperature To and the sub-target temperature Toa of the control range.

The controlled cooling for cooling down the inside of the freezer compartment 11 along the flat temperature curve $Xc_2$, the target inside temperature drop of which is 0 (zero), was examined for three hours. Referring to a chart in FIG. 6, the inverter compressor 32 was alternatively driven at the lowest speed and the second lowest speed and the inside temperature in the central area remained substantially constant (−2° C.). The power consumption in this period was about 520 (Wh).

Figure 9:
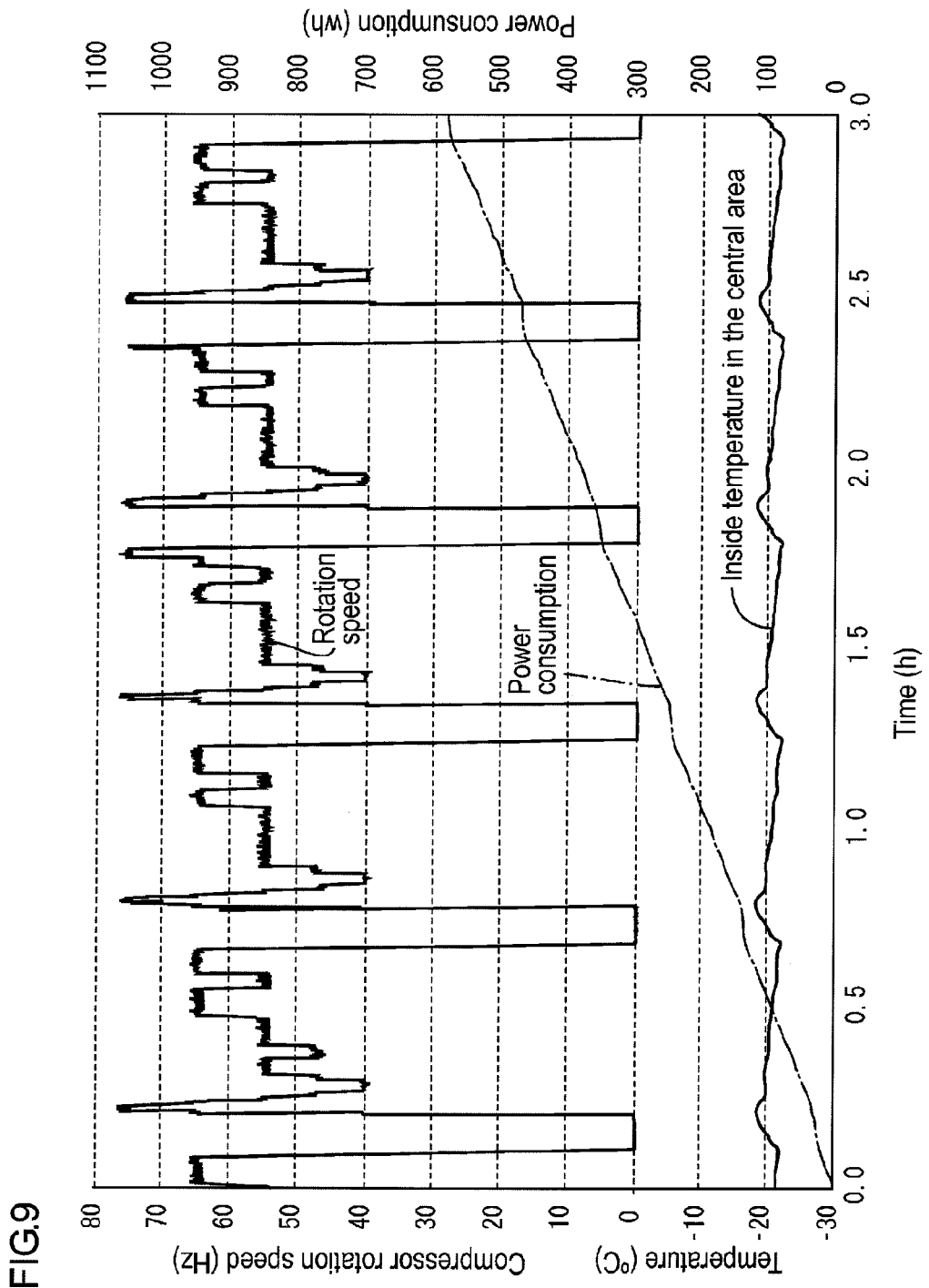
FIG. 9 is a chart illustrating power consumption of the inverter compressor.

In known controlled cooling, the target temperature curve is defined as a line that gently slopes from the upper limit temperature TH to the lower limit temperature TL of the target temperature To. An actual temperature drop is calculated at every predetermined sampling time. It is then compared with the target temperature drop of the above target temperature curve. The inverter compressor speed is controlled based on a result of the comparison such that the inside temperature is controlled along the target temperature curve. A result of examination of such known controlled cooling is illustrated in a chart in FIG. 9.

When the inside temperature decreases to the lower limit temperature TL, the inverter compressor is temporarily stopped and restarted when the inside temperature goes back up to the upper limit temperature TH. Especially right before the inverter compressor is stopped, that is, the inside temperature is near the lower limit temperature TL, the rotation speed of the inverter compressor increases. With this configuration, the power consumption during the three hours of the control exceeded 580 (Wh).

In this embodiment, as described above, the inside temperature TR is maintained at around the target temperature To without being decreased to the lower limit temperature TL during the controlled cooling. Thus, the rotation speed of the inverter compressor 32 is not increased. As a result, the power consumption is reduced and 10% energy saving per hour compared to the known control is achieved.

In this embodiment, after the inside temperature TR has decreased to the target temperature To, cooling control is performed along the flat temperature curve $Xc_2$, the temperature drop of which is 0, so that the inside temperature TR is maintained at around the target temperature To. However, it may decrease below the target temperature To depending on an outside temperature or setting conditions of the target temperature To. Namely, the inside of the freezer compartment 11 may be overcooled.

To compensate for this, the above-described correction device works as follows.

The inside temperature TR detected by the inside temperature sensor 39 may be higher than the lower limit temperature TL but equal to or lower than the sub-target temperature Toa that is 0.5 K lower than the target temperature To. In such a case, the target temperature curve Xc for the control range is corrected such that the target inside temperature drop is −Ac (K/min) in the range equal to or below the sub-target temperature Toa, that is, corrected to a line with a gentle upslope.

An operational flow of the above control will be explained with reference back to FIG. 5. When the inside temperature TR decreases to the sub-target temperature To, a comparison (To−0.5 K)≧TR>TL is performed in step S3. In step S7, the calculated inside temperature drop S is compared with the target inside temperature drop −Ac of the above corrected temperature curve.

If the calculated value S is larger than the target value −Ac and the current rotation speed is not the lowest speed (No in step S8), the inverter compressor 32 reduces the rotation speed by one step (step S10). If it is the lowest speed (Yes in step S8), the inverter compressor 32 maintains the current speed (step S11).

If the calculated value S is equal to the target value −Ac, the inverter compressor 32 maintains the current rotation speed (step S11).

If the calculated value S is smaller than the target value −Ac and the current rotation speed is not the highest speed (No in step S9), the inverter compressor 32 increases the rotation speed by one step (step S12). If it is the highest speed (Yes in step S9), the inverter compressor 32 maintains the current rotation speed (step S11).

The above control is repeatedly performed at every predetermined sampling time, and the inside of the freezer compartment 11 is cooled down along a line with a gentle upslope in the range between the sub-target temperature To and the lower limit temperature TL of the control range.

When the inside temperature TR increases over the sub-target temperature To, that is, it is determined as (To−0.5 K)≧TR>TL in step S3, the flat temperature curve $Xc_2$, the target inside temperature drop of which is 0, is selected again as the target temperature curve and the inside of the freezer compartment 11 is cooled down along the temperature curve $Xc_2$.

By the cooling control, the inside temperature TR is maintained at around the target temperature To with high accuracy.

If the outside temperature is low or the target temperature To is high, the inside of the freezer compartment 11 is cooled down equal to or under the target temperature To (the lower limit temperature TL) even when the rotation speed of the inverter compressor 32 is decreased to the lowest speed. In this embodiment, the stop control function for stopping the inverter compressor 32 when the inside temperature TR is detected as reaching the lower limit temperature TL while the inverter compressor 32 is driven in the control range.

Figure 5:
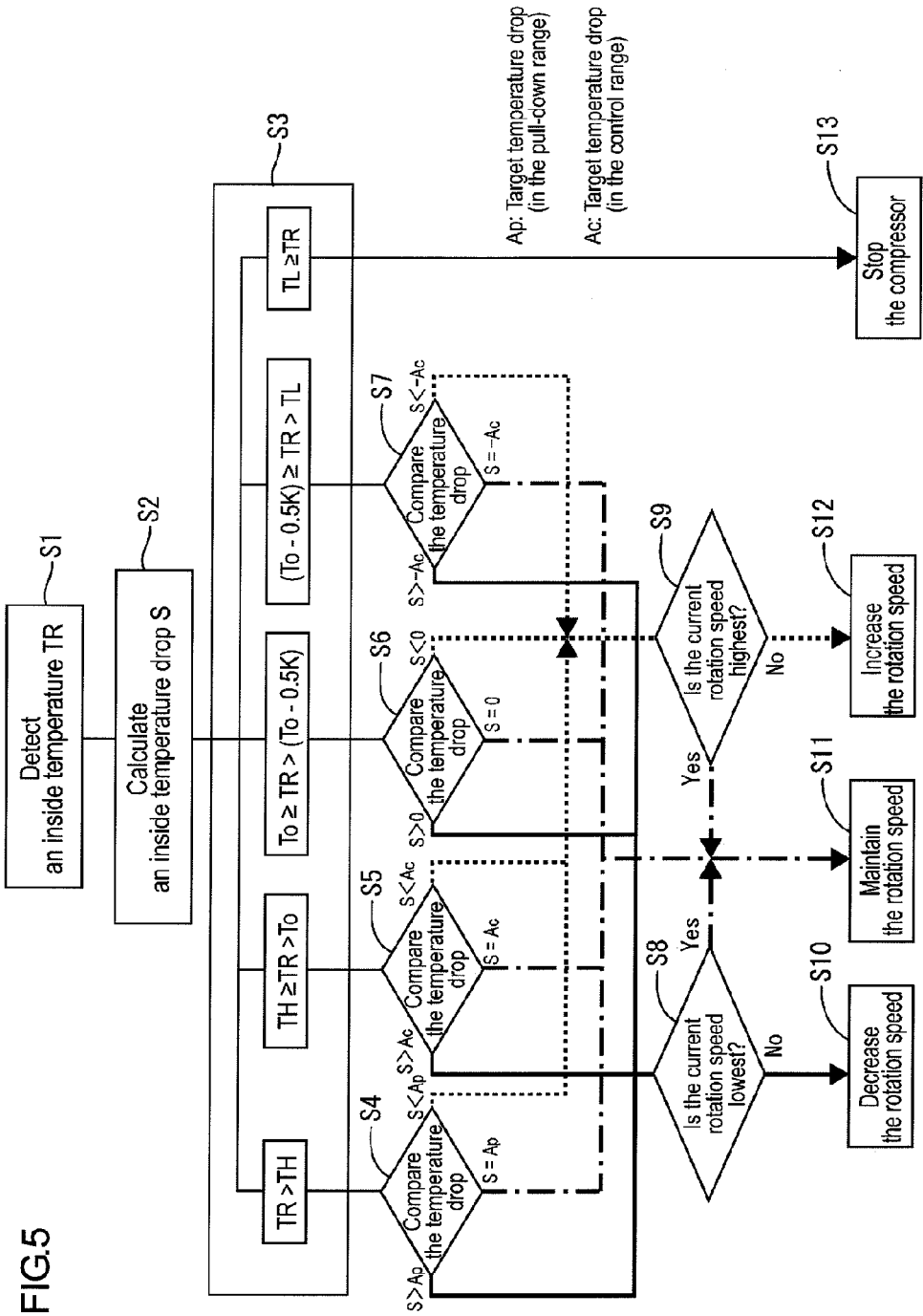
FIG. 5 is a flowchart of the drive control of the inverter compressor.
Figure 6:
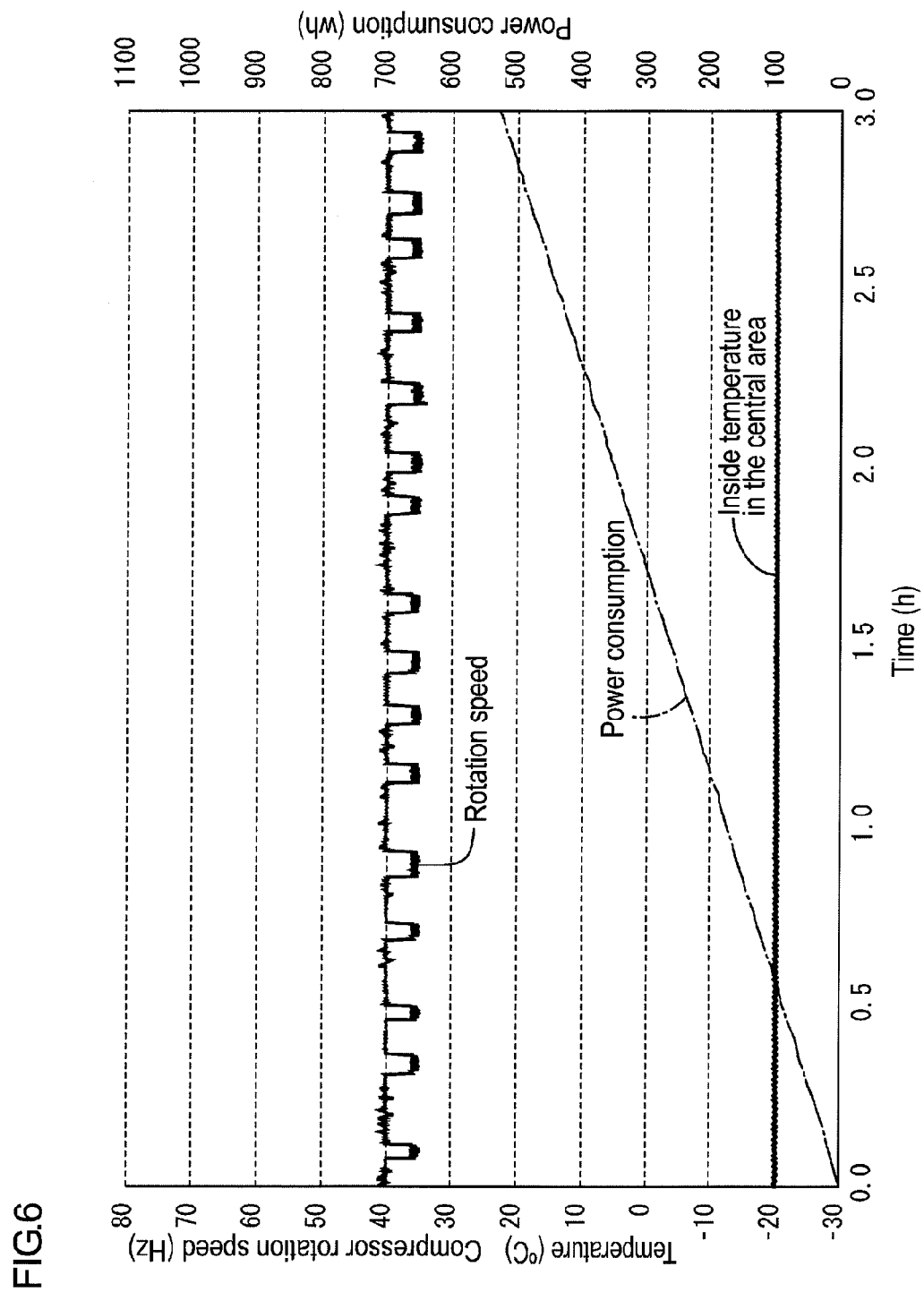
FIG. 6 is a chart illustrating power consumption according to the embodiment.
Figure 7:
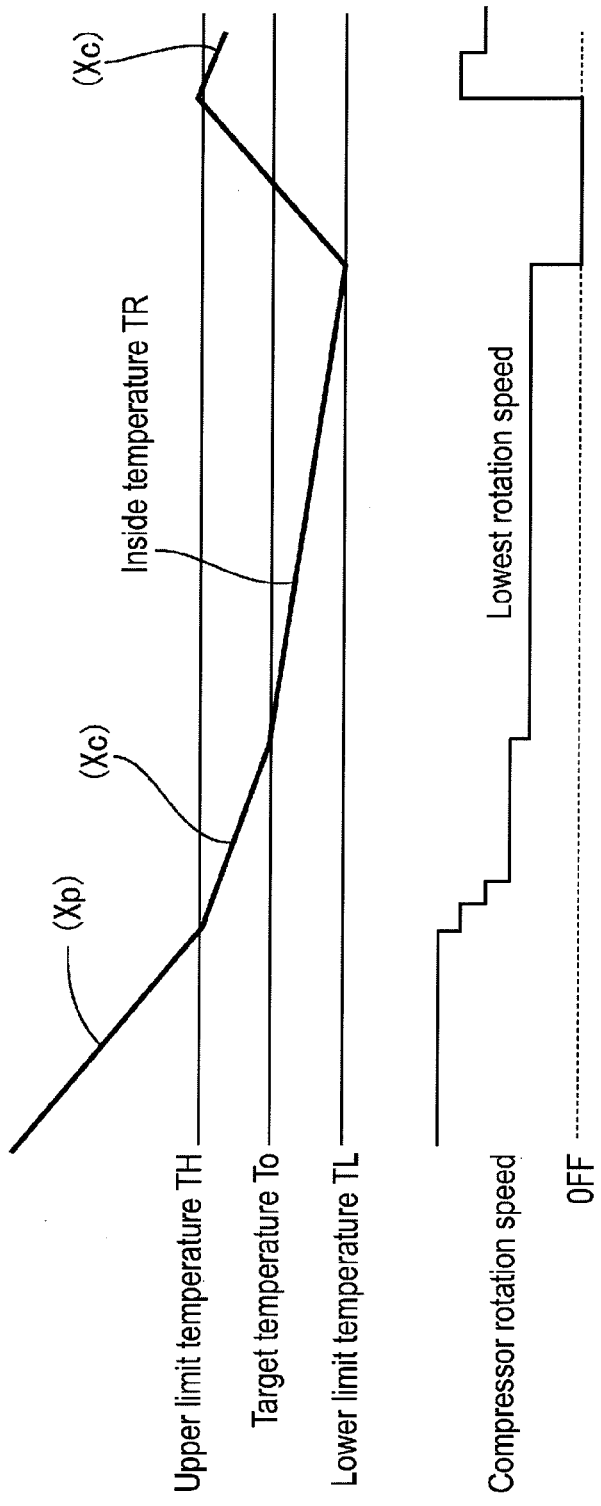
FIG. 7 is a chart illustrating a relationship between the inside temperature and driving conditions of the inverter compressor when stop control of the inverter compressor is performed.
Figure 8:
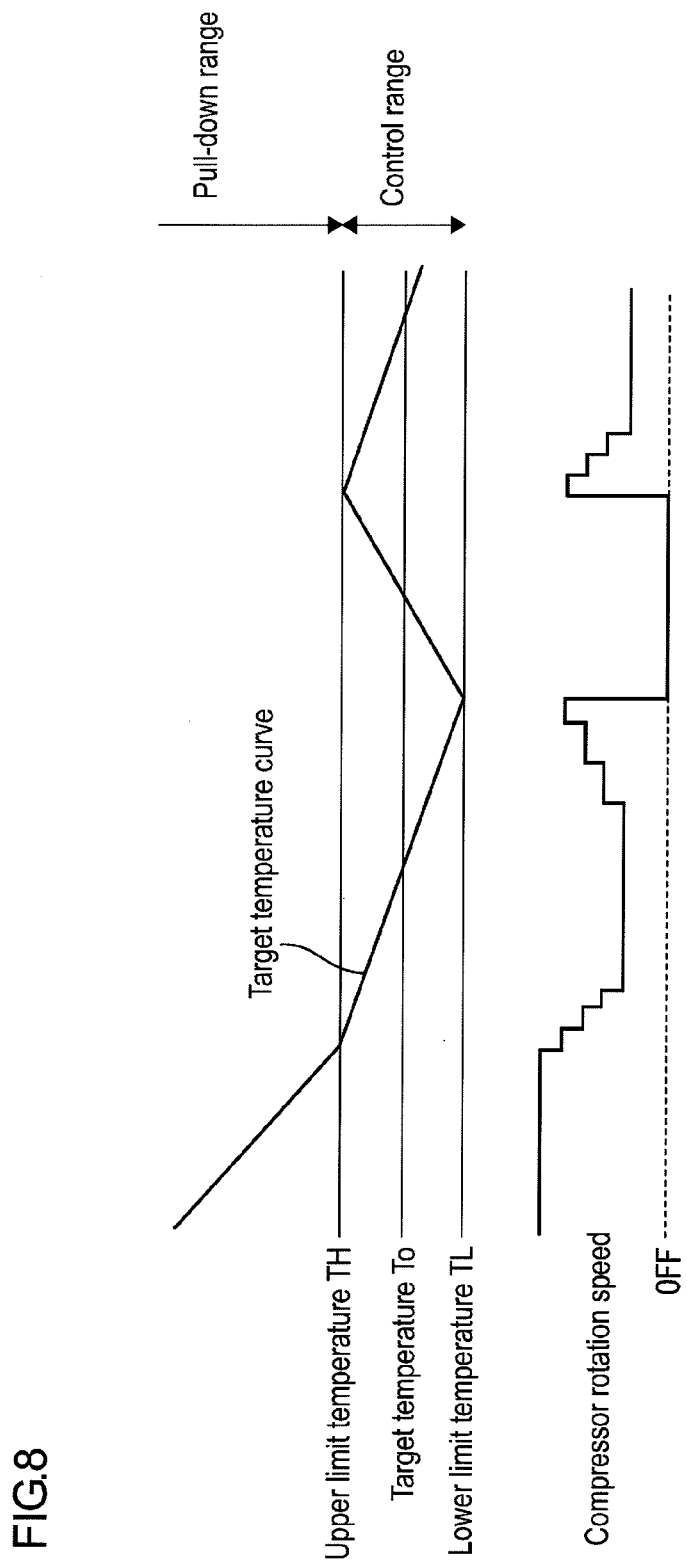
FIG. 8 is a chart illustrating a relationship between cooling characteristics and drive control of an inverter compressor according to a related art.

If the rotation speed of the inverter compressor 32 is reduced to the lowest speed but the inside temperature TR still decreases to the lower limit temperature TL of the target temperature To as illustrated in FIG. 7, a determination TL≧TR is performed in step S3 as illustrated in FIG. 5. Then, the inverter compressor is stopped based on the determination in step S13.

After such control is performed, the freezer compartment 11 is left until the inside temperature naturally increases. When the inside temperature TR returns to the upper limit temperature TH of the target temperature To, the cooling control along the target temperature curve Xc in the control range described above in detail is restarted. With this control, the inside of the freezer compartment 11 is less likely to be cooled down more than necessary.

According to the present embodiment as described the above, the inside temperature TR is maintained at around the target temperature To without being decreased to the lower limit temperature TL. In comparison with the known control that decreases the inside temperature to the lower limit temperature, the inverter compressor 32 can be driven at the lowest rotation speed. As a result, the power consumption is reduced and further energy saving can be achieved.

If the inside temperature TR has become equal to or under the sub-target temperature Toa that is a predetermined temperature lower than the target temperature To during the controlled cooling, the inverter compressor 32 is controlled so that the temperature drop takes a negative value. With this control, the inside temperature TR is maintained at around the target temperature To with high accuracy.

Further, if the outside temperature is low or the target temperature To is high, the inside of the freezer compartment 11 may be cooled down equal to or under the lower limit temperature TL of the target temperature To even when the rotation speed of the inverter compressor 32 is reduced to the lowest rotation speed. In such a case, the inverter compressor 32 is stopped when the inside temperature TR has reached the lower limit temperature TL of the target temperature To. With this control, the inside of the freezer compartment 11 is less likely to be cooled down more than necessary.

Other Embodiments

The present invention is not limited to the embodiment as explained above with reference to the drawing. For example, the following embodiments are included within the scope of the present invention. Furthermore, further various configurations other than the following embodiments are also possible within the scope and spirit of the invention.

(1) In the above embodiment, to maintain the inside temperature at around the target temperature during driving by the controlled cooling, the target temperature curve that is a flat line, namely, the target inside temperature drop of which is 0 (K/min), is used as an example. However, the target inside temperature drop is not limited to 0, and a value near 0, for example, −0.1 to 0.1 (K/min) may be selected so that the target temperature curve is a line that slowly inclines or declines.

(2) In the above embodiment, −Ac (K/min) is used as an example of the target temperature drop for correcting the temperature curve. However, it may be another negative value as long as the temperature slowly increases.

(3) The sub-target temperature used for correcting the temperature curve such that the temperature drop takes a negative value is not limited to the value "the target temperature −0.5 K" used in the above embodiment. It may be set to any temperature lower than the target temperature as long as it is higher than the lower limit temperature.

(4) In the above embodiment, the linear function line is used as an example of the target controlled cooling characteristics data. However, a temperature-time quadratic function curve, or a reference table in which the inside temperature is linked to the target temperature drop may be used.

(5) In the above embodiment, the inverter compressor is used as an example of means of adjusting a cooling capacity of the cooling device. However, a compressor having multiple cylinders and an unload function that adjusts the number of the cylinders to drive according to load.

(6) The present invention is not limited to the freezer used as an example in the above embodiment. It can be widely applied to inside temperature control devices for other types of cold storages including refrigerator-freezers, refrigerators, constant temperature and humidity storage.

The invention claimed is:

1. An inside temperature control device for a cold storage, comprising:

a cooling device including a capacity variable type compressor;

a memory device configured to store data on a cooling characteristic that shows how a target temperature drop varies over time in a cooling range between an upper limit temperature that is a predetermined temperature higher than a predetermined target temperature and a lower limit temperature that is a predetermined temperature lower than said target temperature;

a temperature sensor configured to detect an inside temperature; and a drive control device configured to adjust a capacity of said compressor such that said inside temperature decreases along said cooling characteristic read from said memory device based on an output of said temperature sensor, wherein said cooling characteristic stored in said memory device is defined such that a temperature drop remains at substantially zero after a temperature has decreased from said upper limit temperature and reached said target temperature, wherein said compressor is a speed controllable inverter compressor, including:

a temperature variation calculation section configured to calculate an inside temperature drop at every predetermined sampling time based on a signal from said temperature sensor;

a target temperature drop output section configured to output a target temperature drop for an inside temperature at said sampling time based on said cooling characteristic data stored in said memory device at every said sampling time;

a comparison section configured to compare an actual temperature drop calculated by said temperature variation calculation section with said target temperature drop output from said target temperature drop output section; and a speed control section configured to control a speed of said inverter compressor based on a comparison result from said comparison section so as to increase the speed of said inverter compressor when said actual temperature drop is smaller than said target temperature drop and to decrease the speed of said inverter compressor when said actual temperature drop is larger than said target temperature drop, and wherein said drive control device further includes a correction device configured to correct said cooling characteristic such that said target temperature drop takes a negative value in a range equal to or under a sub-target temperature that is higher than said lower limit temperature but a predetermined temperature lower than said target temperature when an inside temperature is determined as equal to or lower than said sub-target temperature.

2. The inside temperature control device for a cold storage according to claim 1, wherein said drive control device further includes an inverter compressor stop function configured to stop said inverter compressor when an inside temperature is detected as reaching said lower limit temperature.

3. The inside temperature control device for a cold storage according to claim 1, wherein said target temperature drop is defined as temperature drop per unit time.

4. An inside temperature control device for a cold storage, comprising:
a cooling device including a capacity variable type compressor;
a memory device configured to store data on a cooling characteristic that shows how a target rate of temperature drop varies over time in a pull-down range, a first control range, and a second control range;
a temperature sensor configured to detect an inside temperature; and
a drive control device configured to adjust a capacity of said compressor such that said inside temperature decreases along said cooling characteristic read from said memory device based on an output of said temperature sensor,
wherein said pull-down range is a temperature range above an upper limit temperature, said first control range is a temperature range between said upper limit temperature and a predetermined target temperature, and said second control range is a temperature range between said predetermined target temperature and a lower limit temperature, said upper limit temperature being a predetermined temperature higher than said predetermined target temperature and said lower limit temperature being a predetermined temperature lower than said target temperature,
wherein a target rate of temperature drop in said first control range is a constant value smaller than a target rate of temperature drop in said pull-down range, and a target rate of temperature drop in said second control range is set substantially at zero,
wherein said compressor is a speed controllable inverter compressor, including:
a temperature variation calculation section configured to calculate an inside temperature drop at every predetermined sampling time based on a signal from said temperature sensor;
a target temperature drop output section configured to output a target temperature drop for an inside temperature at said sampling time based on said cooling characteristic data stored in said memory device at every said sampling time;
a comparison section configured to compare an actual temperature drop calculated by said temperature variation calculation section with said target temperature drop output from said target rate of temperature drop output section; and
a speed control section configured to control a speed of said inverter compressor based on a comparison result from said comparison section so as to increase the speed of said inverter compressor when said actual temperature drop is smaller than said target temperature drop and to decrease the speed of said inverter compressor when said actual temperature drop is larger than said target temperature drop, and wherein said drive control device further includes a correction device configured to correct said cooling characteristic such that said target rate of temperature drop takes a negative value in a range equal to or under a sub-target temperature that is higher than said lower limit temperature but a predetermined temperature lower than said target temperature when an inside temperature is determined as equal to or lower than said sub-target temperature.

5. An inside temperature control device for a cold storage, comprising:
a cooling device including a capacity variable type compressor;
a memory device configured to store data on a cooling characteristic that shows how a target rate of temperature drop varies over time in a pull-down range, a first control range, and a second control range;
a temperature sensor configured to detect an inside temperature; and
a drive control device configured to adjust a capacity of said compressor such that said inside temperature decreases along said cooling characteristic read from said memory device based on an output of said temperature sensor,
wherein said pull-down range is a temperature range above an upper limit temperature, said first control range is a temperature range between said upper limit temperature and a predetermined target temperature, and said second control range is a temperature range between said predetermined target temperature and a lower limit temperature, said upper limit temperature being a predetermined temperature higher than said predetermined target temperature and said lower limit temperature being a predetermined temperature lower than said target temperature,
wherein a target rate of temperature drop in said first control range is a constant value smaller than a target rate of temperature drop in said pull-down range, and a target rate of temperature drop in said second control range is set substantially at zero,
wherein said compressor is a speed controllable inverter compressor, including:
a temperature variation calculation section configured to calculate an inside temperature drop at every predetermined sampling time based on a signal from said temperature sensor;
a target temperature drop output section configured to output a target temperature drop for an inside temperature at said sampling time based on said cooling characteristic data stored in said memory device at every said sampling time;
a comparison section configured to compare an actual temperature drop calculated by said temperature variation calculation section with said target temperature drop output from said target rate of temperature drop output section; and a speed control section configured to control a speed of said inverter compressor based on a comparison result from said comparison section so as to increase the speed of said inverter compressor when said actual temperature drop is smaller than said target temperature drop and to decrease the speed of said inverter compressor when said actual temperature drop is larger than said target temperature drop, and wherein said drive control device further includes a correction device configured to correct said cooling characteristic such that said target rate of temperature drop takes a negative value in a range equal to or under a sub-target temperature that is higher than said lower limit temperature but a predetermined temperature lower than said target temperature when an inside temperature is determined as equal to or lower than said sub-target temperature, and wherein said drive control device further includes an inverter compressor stop function configured to stop said inverter compressor when an inside temperature is detected as reaching said lower limit temperature.

* * * * *